(12) United States Patent
Kamon (10) Patent No.: US 8,792,017 B2
(45) Date of Patent: Jul. 29, 2014

(54) IMAGE PROCESSING DEVICE, IMAGE PROCESSING METHOD, AND IMAGE PICKUP APPARATUS

(75) Inventor: Koichi Kamon, Otokuni-gun (JP)

(73) Assignee: Konica Minolta Opto, Inc., Hachioji-Shi (JP)

(*) Notice: Subject to any disclaimer, the term of this patent is extended or adjusted under 35 U.S.C. 154(b) by 537 days.

(21) Appl. No.: 13/192,665

(22) Filed: Jul. 28, 2011

(65) Prior Publication Data

US 2011/0279714 A1 Nov. 17, 2011

Related U.S. Application Data

(62) Division of application No. 12/197,483, filed on Aug. 25, 2008, now Pat. No. 8,068,149.

(30) Foreign Application Priority Data

Aug. 28, 2007 (JP) .................................. 2007-221584

(51) Int. Cl.
 *H04N 5/235* (2006.01)
(52) U.S. Cl.
 USPC .................................... 348/229.1; 348/222.1
(58) Field of Classification Search
 USPC ................ 348/222.1, 229.1, 335, 234, 241
 See application file for complete search history.

(56) References Cited

U.S. PATENT DOCUMENTS

| | | | |
|---|---|---|---|
| 5,294,976 A | 3/1994 | Ohyama et al. | 348/229.1 |
| 5,376,964 A | 12/1994 | Soga et al. | 348/229.1 |
| 5,801,773 A | 9/1998 | Ikeda | 348/229.1 |
| 7,379,620 B2 | 5/2008 | Kobayashi | 382/284 |
| 8,285,067 B2 * | 10/2012 | Steinberg et al. | 382/255 |
| 8,294,781 B2 * | 10/2012 | Cote et al. | 348/222.1 |
| 2006/0001061 A1 | 1/2006 | Miyatake et al. | 257/292 |
| 2006/0188172 A1 | 8/2006 | Higurashi et al. | 382/275 |

FOREIGN PATENT DOCUMENTS

| | | |
|---|---|---|
| JP | 10-210360 A | 8/1998 |
| JP | 2000-078467 A | 3/2000 |
| JP | 2002-199410 A | 7/2002 |
| JP | 2003-189169 A | 7/2003 |
| JP | 2005-045514 A | 2/2005 |

(Continued)

OTHER PUBLICATIONS

English Translation of an Office Action issued on Mar. 13, 2012 in the corresponding Japanese Application No. 2007-221584.

(Continued)

*Primary Examiner* — Tuan Ho
(74) *Attorney, Agent, or Firm* — Cozen O'Connor (57) ABSTRACT

An image processing device includes a corrector for performing an optical correction of correcting a distortion of an image by interpolating image data of the distorted picked-up image resulting from an optical characteristic of an image pickup section, and locally changing a resolution of the image; and a compressor for performing a dynamic range compression of compressing a dynamic range of the image data by extracting an illumination component from the image data based on a space frequency of the image, and compressing the extracted illumination component, wherein the compressor performs the dynamic range compression with respect to image data of an after-correction-image to be obtained after the optical correction is performed by the corrector.

1 Claim, 6 Drawing Sheets

(56) References Cited

FOREIGN PATENT DOCUMENTS

| | | |
|---|---|---|
| JP | 2005-143032 A | 6/2005 |
| JP | 2006-050544 A | 2/2006 |
| JP | 2007-060492 A | 3/2007 |
| JP | 2007-082181 | 3/2007 |
| JP | 2007-134777 A | 5/2007 |
| JP | 2007-189405 | 7/2007 |

OTHER PUBLICATIONS

K. Sato et al, "Contrast Improvement for a Linear/Log CMOS Image Sensor", Konica Minolta Technology Report, vol. 4 (2007); Together with an English-language abstract and partial translation thereof.
Japanese Notice of Reasons for Rejection dated Aug. 2, 2011, for counterpart Japanese Patent Application No. 2007-221584, together with an English translation thereof.

* cited by examiner

IMAGE PROCESSING DEVICE, IMAGE PROCESSING METHOD, AND IMAGE PICKUP APPARATUS

This application is a divisional application of application Ser. No. 12/197,483, filed Aug. 25, 2008, which is based on Japanese Patent Application No. 2007-221584 filed on Aug. 28, 2007, the entire contents of which are hereby incorporated by reference.

BACKGROUND OF THE INVENTION

1. Field of the Invention

The present invention relates to an image processing technology for processing an image picked up by an image pickup section.

2. Description of the Related Art

In recent years, a CMOS image sensor or a like device having a linear characteristic and a logarithmic characteristic is incorporated in an image pickup apparatus such as a digital camera to increase the dynamic range of image data. The following technologies have also been known in relation to the above.

For instance, the article "Contrast Improvement for a Linear/Log CMOS Image Sensor" (D1) in Konica Minolta Technology Report Vol. 4 (2007) discloses a technique for compressing the dynamic range of image data, wherein an illumination component i.e. a low frequency component of image data is extracted based on a space frequency of an image, and the extracted illumination component is compressed, with a reflectance component being left uncompressed.

U.S. Patent Application Publication No. 2006/0188172A1 (D2) corresponding to Japanese Unexamined Patent Publication No. 2005-45514 discloses a technique for correcting a distortion of a picked up image resulting from distortion aberration of a lens by performing linear interpolation with use of vicinity pixels and changing the resolution of the image depending on the image pickup position.

U.S. Patent Application Publication No. 2006/0001061A1 (D3) corresponding to Japanese Unexamined Patent Publication No. 2006-50544 discloses an image sensor operable to linearly convert incident light into an electrical signal until the incident light amount reaches a predetermined light amount, and logarithmically convert the incident light into an electrical signal if the incident light amount exceeds the predetermined light amount.

In the case where an image pickup apparatus is incorporated with one of the arrangements disclosed in D1 through D3, there is a likelihood that a degraded image may be outputted depending on the order of processing. Specifically, observing an image to be obtained before the correction processing disclosed in D2 is performed, the space frequency of an image signal obtained from a central part of a picked-up subject image may be different from the space frequency of an image signal obtained from a peripheral part of the picked-up subject image. Under the above condition, if the dynamic range compression disclosed in D1 is applied to the arrangement disclosed in D2 without any processing, image data corresponding to some part of the subject image may be compressed, and image data corresponding to the other part of the subject image may be left uncompressed depending on the image pickup position.

The image sensor disclosed in D3 has two kinds of photoelectric conversion characteristics, and image data of an image picked up by the image sensor has the two kinds of photoelectric conversion characteristics. Accordingly, if the correction processing disclosed in D2 is applied to the image sensor disclosed in D3 without any processing, pixels having the different photoelectric conversion characteristics may be subjected to linear interpolation, with the result that output image data may have the different photoelectric conversion characteristics.

SUMMARY OF THE INVENTION

It is an object of the present invention to provide a technology which can solve the problems residing in the conventional art.

An image processing device according to an aspect of the invention includes at least two of: a converter for unifying multiple photoelectric conversion characteristics of image data of an image picked up by an image pickup section having multiple photoelectric conversion characteristics into a single photoelectric conversion characteristic; a corrector for performing an optical correction of correcting a distortion of the image by interpolating image data of the distorted picked-up image resulting from an optical characteristic of the image pickup section, and locally changing a resolution of the image; and a compressor for performing a dynamic range compression of compressing a dynamic range of image data by extracting an illumination component from the image data based on a space frequency of the image, and compressing the extracted illumination component, wherein the compressor performs the dynamic range compression with respect to image data to be obtained after the optical correction is performed by the corrector, and the converter performs a processing of unifying the photoelectric conversion characteristics with respect to image data to be obtained before the optical correction is performed by the corrector.

An image processing method according to another aspect of the invention includes: a correcting step of performing an optical correction of correcting a distortion of an image by interpolating image data of the distorted picked-up image resulting from an optical characteristic of an image pickup section, and locally changing a resolution of the image; and a compressing step of performing a dynamic range compression of compressing a dynamic range of the image data by extracting an illumination component from the image data based on a space frequency of the image, and compressing the extracted illumination component, wherein the compressing step is performed after the correcting step.

An image processing method according to yet another aspect of the invention includes: a converting step of unifying multiple photoelectric conversion characteristics of image data of an image picked up by an image pickup section having multiple photoelectric conversion characteristics into a single photoelectric conversion characteristic; and a correcting step of performing an optical correction of correcting a distortion of the image by interpolating image data of the distorted picked-up image resulting from an optical characteristic of the image pickup section, and locally changing a resolution of the image, wherein the converting step is performed before the correcting step.

An image pickup apparatus according to still another aspect of the invention includes the image processing device having the above arrangement.

These and other objects, features and advantages of the present invention will become more apparent upon reading the following detailed description along with the accompanying drawings.

DETAILED DESCRIPTION OF THE PREFERRED EMBODIMENTS OF THE INVENTION

The invention is now described, by way of example, with reference to the accompanying drawings.

Figure 1:
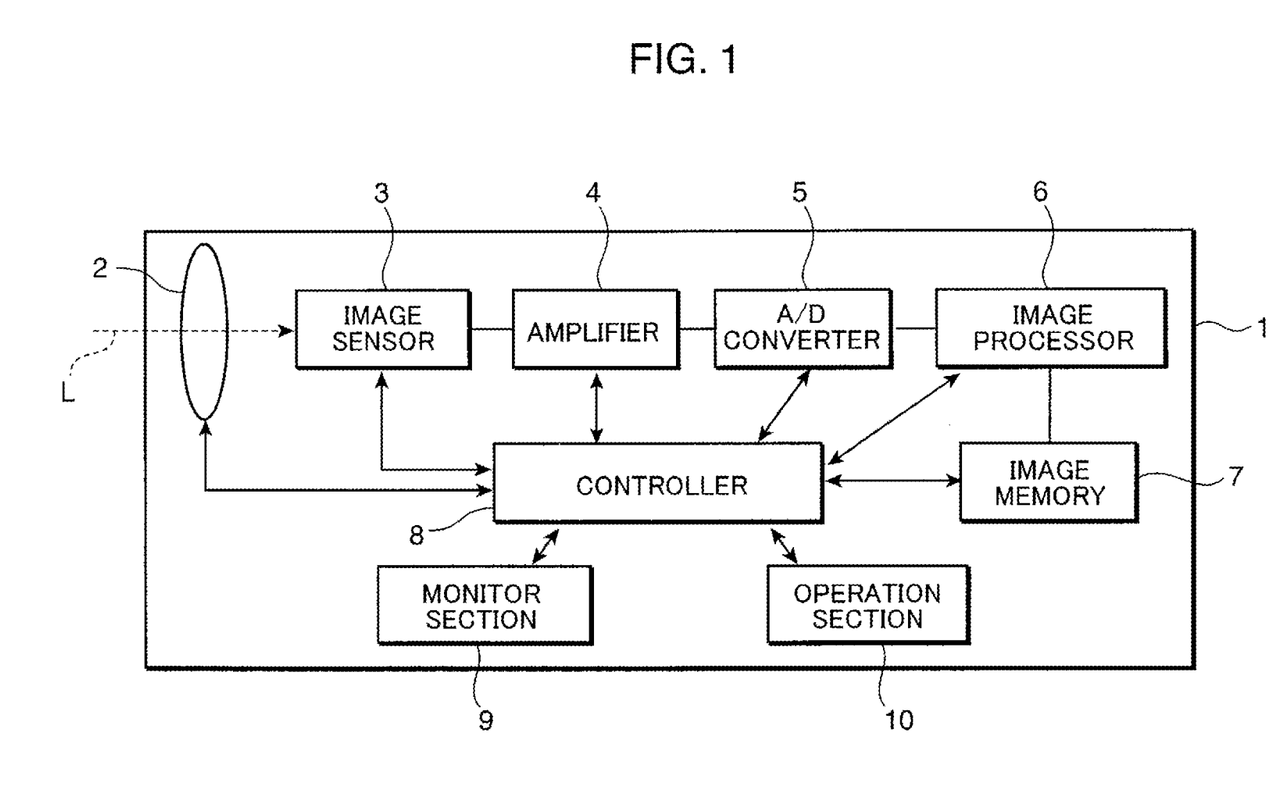
FIG. 1 is a block diagram of an image pickup apparatus embodying the invention.

FIG. 1 is a block diagram of an image pickup apparatus 1 embodying the invention. As shown in FIG. 1, the image pickup apparatus 1 is constituted of a digital camera, and includes a lens section 2, an image sensor 3, an amplifier 4, an A/D converter 5, an image processor 6, an image memory 7, a controller 8, a monitor section 9, and an operation section 10. The lens section 2 and the image sensor 3 constitute an image pickup section.

The lens section 2 is constituted of an optical lens system for receiving a light image of a subject, and guiding the light image to the image sensor 3. The optical lens system may include e.g. a zoom lens, a focus lens, and other fixed lens block arranged in series along the optical axis L of the subject light image. The lens section 2 includes a diaphragm (not shown) and a shutter (not shown) for adjusting the amount of light transmitted through the lens section 2. Driving of the diaphragm and the shutter is controlled under the control of the controller 8.

The image sensor 3 photoelectrically converts the light image formed on a light receiving surface of the image sensor 3 through the lens section 2 to generate image signals of color components of R (red), G (green), and B (blue) having respective levels in accordance with the received light amount, and outputs the image signals to the amplifier 4. The image sensor 3 is an image sensor having multiple photoelectric conversion characteristics. In this embodiment, the image sensor 3 is a CMOS image sensor having two kinds of photoelectric conversion characteristics i.e. a linear characteristic in a low luminance range, and a logarithmic characteristic in a high luminance range. The photoelectric conversion characteristics are not limited to the aforementioned two kinds. An image sensor having three or more kinds of photoelectric conversion characteristics may be used. Further alternatively, the image sensor 3 may be an image sensor other than the CMOS image sensor, such as a VMIS image sensor or a CCD image sensor.

Figure 2:
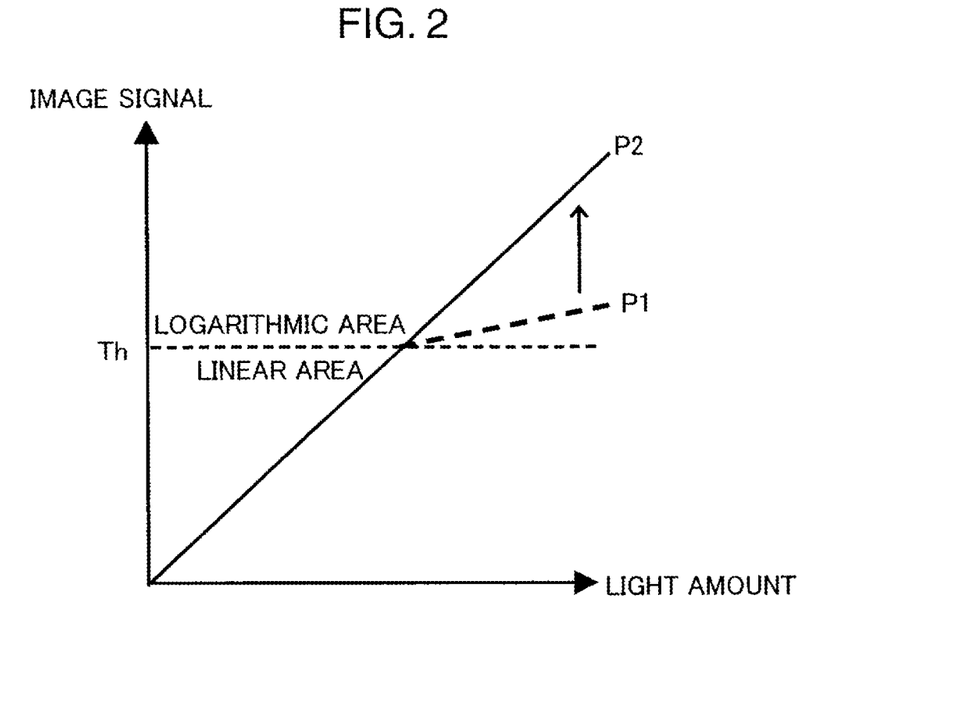
FIG. 2 is a graph showing photoelectric conversion characteristics of an image sensor shown in FIG. 1.

FIG. 2 is a graph showing photoelectric conversion characteristics of the image sensor 3 shown in FIG. 1. In FIG. 2, the axis of abscissas indicates an image signal, and the axis of ordinate indicates an amount of light received on the light receiving surface of the image sensor 3. In a linear area where the image signal has a value equal to or smaller than a predetermined threshold value Th, as shown by the solid line P2 in FIG. 2, the image signal is linearly changed with respect to the light amount. However, in a logarithmic area where the image signal has a value larger than the threshold value Th, as shown by the bold broken line P1 in FIG. 2, the image signal is logarithmically changed with respect to the light amount. As shown in FIG. 2, it is obvious that the image sensor 3 has two kinds of photoelectric conversion characteristics, i.e. a linear characteristic in a low luminance range, and a logarithmic characteristic in a high luminance range with respect to an inflection point Px.

Referring back to FIG. 1, the amplifier 4 includes e.g. an AGC (auto gain control) circuit and a CDS (correlation double sampling) circuit, and amplifies an image signal outputted from the image sensor 3. The A/D converter 5 converts the image signal amplified by the amplifier 4 into digital image data. In this embodiment, an image signal from each pixel of the image sensor 3 is converted into pixel data having a gradation value of e.g. 12 bits.

The image processor 6 performs, with respect to the image data outputted from the A/D converter 5, various image processing such as FPN (fixed pattern noise) correction, black reference correction, and white balance correction; and also performs processing of unifying the photoelectric conversion characteristics, which is described later, optical correction, and dynamic range compression. The image memory 7 is constituted of e.g. an RAM (Random Access Memory), and stores image data or the like which has undergone image processing by the image processor 6.

The controller 8 includes an ROM for storing various control programs and the like, an RAM for temporarily storing data, and a CPU (Central Processing Unit) for reading out the control programs and the like from the ROM for execution. The controller 8 controls overall operations of the image pickup apparatus 1.

The monitor section 9 includes e.g. a color liquid crystal display to be provided on a rear surface of a housing of the image pickup apparatus 1, and displays, on a monitor screen thereof, an image picked up by the image sensor 3, an image stored in the image memory 7, or the like.

The operation section 10 includes various operation switches such as a power source switch, a release switch, a mode setting switch for setting various image shooting modes, and a menu selecting switch. In response to user's depressing the release switch, a series of photographing operations including an image pickup operation of picking up a subject image by the image sensor 3, performing predetermined image processing with respect to image data acquired by the image pickup operation, and recording the image data into the image memory 7 or the like are performed.

Figure 3:
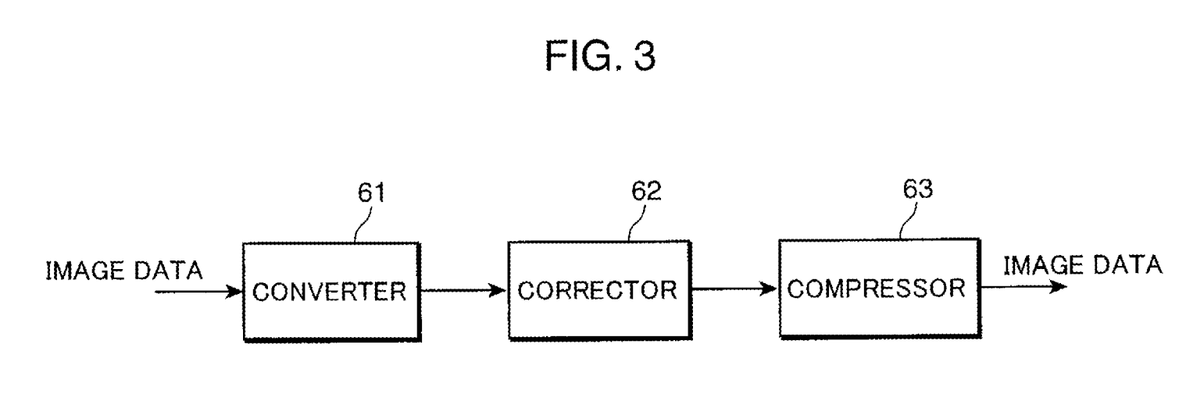
FIG. 3 is a block diagram of a detailed arrangement of an image processor shown in FIG. 1.

FIG. 3 is a block diagram of a detailed arrangement of the image processor 6 shown in FIG. 1. The image processor 6 includes a converter 61, a corrector 62, and a compressor 63.

The converter 61 unifies multiple photoelectric conversion characteristics of image data of an image picked up by the image sensor 3 having photoelectric conversion characteristics into a single photoelectric conversion characteristic. In this embodiment, the image sensor 3 has two kinds of photoelectric conversion characteristics i.e. a linear characteristic and a logarithmic characteristic. The converter 61 unifies the photoelectric conversion characteristics of image data of an image picked up by the image sensor 3 into a linear characteristic. Alternatively, the converter 61 may unify the photoelectric conversion characteristics of image data of an image picked up by the image sensor 3 into a logarithmic characteristic, in place of a linear characteristic. Further alternatively, in the case where the image sensor 3 has three or more kinds of photoelectric conversion characteristics, the converter 61 may unify the three or more kinds of photoelectric conversion characteristics into any one of the three or more kinds of photoelectric conversion characteristics. In the latter modification, the photoelectric conversion characteristics may be unified into a photoelectric conversion characteristic other than the photoelectric conversion characteristics of the image sensor 3.

Examples of the photoelectric conversion characteristic other than the linear characteristic and the logarithmic characteristic include photoelectric conversion characteristics to be obtained by a two-time exposure mode, wherein two frames of image data obtained by different exposure times are combined into one frame of image data; and photoelectric conversion characteristics to be obtained by using an adaptive sensor as the image sensor 3. The former or latter photoelectric conversion characteristics are expressed by two straight lines having different gradients from each other. Accordingly, in the case where the former or latter photoelectric conversion characteristics are used, the converter 61 may perform image processing of unifying the photoelectric conversion characteristics into one of the two straight lines. In this modification, the photoelectric conversion characteristics may be unified into a photoelectric conversion characteristic other than the photoelectric conversion characteristics of the image sensor 3.

Figure 4:
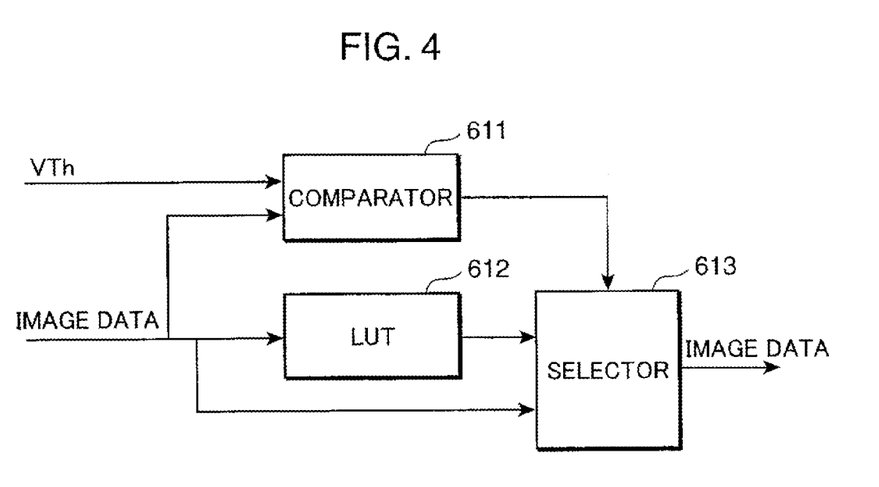
FIG. 4 is a block diagram of a detailed arrangement of a converter shown in FIG. 3.

FIG. 4 is a block diagram of a detailed arrangement of the converter 61 shown in FIG. 3. The converter 61 includes a comparator 611, an LUT (lookup table) 612, and a selector 613. The comparator 611 compares the gradation value of image data outputted from the A/D converter 5 shown in FIG. 1 in the unit of pixel with a predetermined reference value Vth corresponding to the threshold value Th, which is a value of the image signal at the inflection point Px between the linear characteristic and the logarithmic characteristic. In the case where the gradation value is larger than the reference value Vth, the comparator 611 outputs, to the selector 613, a selection signal requesting the selector 613 to receive image data outputted via the LUT 612. On the other hand, in the case where the gradation value is equal to or smaller than the reference value Vth, the comparator 611 outputs, to the selector 613, a selection signal requesting the selector 613 to receive image data which has been outputted without via the LUT 612. The reference value Vth may be a value obtained by converting the threshold value Th shown in FIG. 2 by the A/D converter 5, in other words, a gradation value obtained by expressing the threshold value Th as data of 12 bits.

The LUT 612 stores predetermined conversion values corresponding to respective gradation values of image data to be outputted from the A/D converter 5 so as to convert the logarithmic characteristic P1 shown in FIG. 2 into the linear characteristic P2 shown in FIG. 2; reads out a conversion value corresponding to the gradation value of image data, in response to output of the image data from the A/D converter 5; and outputs the readout conversion value to the selector 613.

In the case where a selection signal requesting the selector 613 to receive image data which has been outputted via the LUT 612 is issued from the comparator 611, the selector 613 selects the conversion value which has been outputted via the LUT 612, and outputs the conversion value to the corrector 62 as image data. In the case where a selection signal requesting the selector 613 to receive image data which has been outputted without via the LUT 612 is issued from the comparator 611, the selector 613 selects the image data which has been outputted from the A/D converter 5 without via the LUT 612, and outputs the image data to the corrector 62.

By performing the above operation, the logarithmic characteristic P1 shown in FIG. 2 in the high luminance range where the value of the image signal is larger than the threshold value Th is converted into the linear characteristic P2. Thereby, the two kinds of photoelectric conversion characteristics P1 and P2 are unified into a photoelectric conversion characteristic of a single kind i.e. the linear characteristic P2.

Referring back to FIG. 3, the corrector 62 performs an optical correction of correcting a distortion of an image by interpolating image data of a distorted picked-up image resulting from an optical characteristic of the lens section 2 shown in FIG. 1, specifically, interpolating a target pixel with use of vicinity pixels; and locally changing the resolution of the image.

Figure 5:
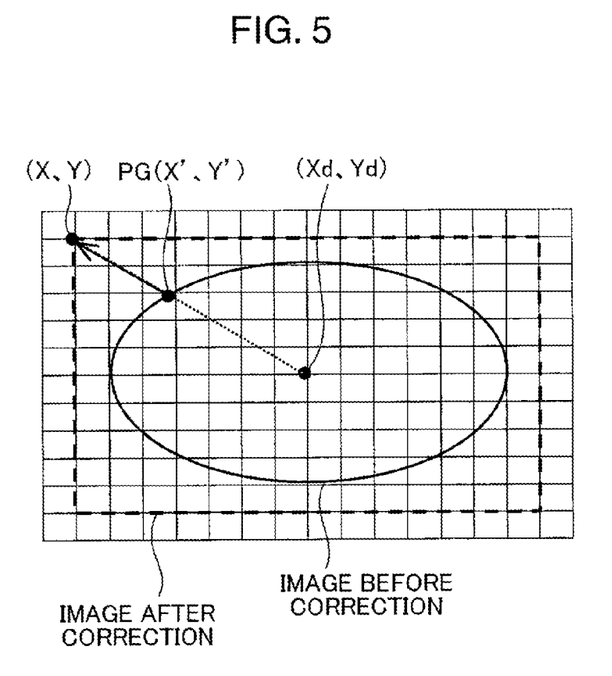
FIG. 5 is a schematic diagram describing an optical correction to be performed by a corrector shown in FIG. 3.

FIG. 5 is a schematic diagram describing the optical correction to be performed by the corrector 62. Each vertex of the squares arranged in a grid pattern in FIG. 5 corresponds to each pixel of an after-correction-image by the corrector 62. The elliptical circle indicates a before-correction-image by the corrector 62, and the dotted rectangle indicates the after-correction-image.

As shown in FIG. 5, the before-correction-image has an elliptical shape, resulting from the optical characteristic of the lens section 2, whereas the dotted rectangle shown in FIG. 5 indicates an image without distortion. The corrector 62 removes the distortion by shifting the coordinate value of each pixel in the before-correction-image in such a manner that the elliptical image is extended to an area corresponding to the after-correction-image indicated by the dotted rectangle. For instance, the pixel PG located at the coordinate value (X',Y') in the before-correction-image is shifted to the coordinate value (X,Y) at the uppermost and leftmost position in the after-correction-image. A shift amount of each pixel differs among the pixel positions depending on the optical characteristic of the lens section 2 in such a manner that the shift amount is decreased, as the pixel approaches the middle part of the before-correction-image, and the shift amount is increased, as the pixel approaches the peripheral part of the before-correction-image. This means that the resolution of an after-correction-image is made substantially uniform in the entirety of the image data, whereas the resolution of a before-correction-image is locally varied.

Figure 6:
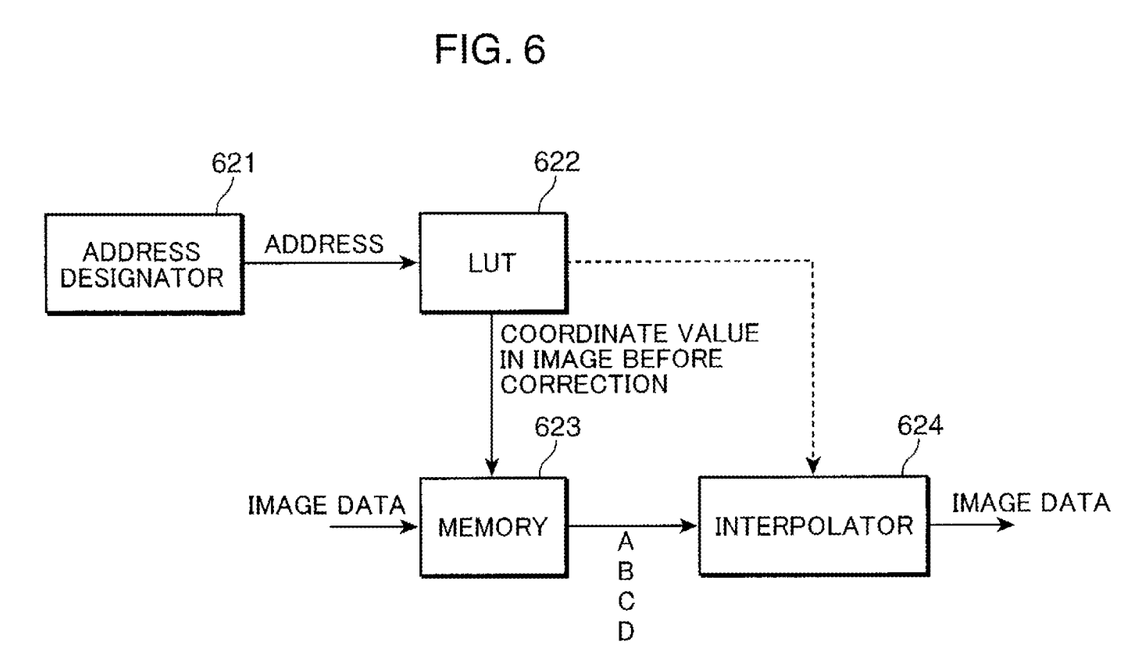
FIG. 6 is a block diagram of a detailed arrangement of the corrector shown in FIG. 3.

FIG. 6 is a block diagram of a detailed arrangement of the corrector 62 shown in FIG. 3. The corrector 62 includes an address designator 621 as a coordinate output section, an LUT 622 as a coordinate storage, a memory 623 as an image data storage, and an interpolator 624. The address designator 621 sequentially designates the address of the LUT 622 which is correlated to each pixel in a frame of after-correction-image. In this embodiment, the address designator 621 sequentially designates the address of the LUT 622 which is correlated to each pixel in an after-correction-image in such a manner that a raster scan is performed e.g. from the pixel at the uppermost and leftmost vertex to the pixel at the lowermost and rightmost vertex in a frame of after-correction-image.

The LUT 622 stores predetermined coordinate values in the before-correction-image in correlation to the respective pixels in the after-correction-image to perform optical correction with respect to the before-correction-image. Specifically, the LUT 622 stores a coordinate value in a frame of before-correction-image in an address to which each pixel in a frame of after-correction-image is correlated. In response to designation of an address from the address designator 621, the LUT 622 outputs, to the memory 623, the coordinate value in the before-correction-image, which is stored in the designated address.

The memory 623 stores one frame of image data to be outputted from the converter 61 shown in FIG. 3. In response to output of the coordinate value from the LUT 622, the memory 623 outputs, to the interpolator 624, pixel data of four vicinity pixels located at four corners of a target pixel located at the outputted coordinate value. The interpolator 624 calculates an average value of pixel data at the four vicinity pixels outputted from the memory 623, and defines the average value as pixel data of the target pixel.

Figure 7:
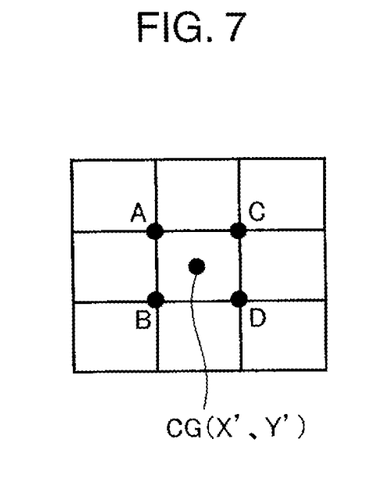
FIG. 7 is a schematic diagram of a before-correction-image to be obtained before correction is performed by the corrector shown in FIG. 3.

FIG. 7 is a schematic diagram describing a processing to be performed by the memory 623 and the interpolator 624. The symbols A, B, C, and D shown in FIG. 7 indicate four vicinity pixels located at four corners of a target pixel CG. As shown in FIG. 7, in response to output of the coordinate value (X',Y') of the target pixel CG from the LUT 622, the memory 623 outputs pixel data of the vicinity pixels A, B, C, and D to the interpolator 624. Then, the interpolator 624 performs a computation: Dg=(Da+Db+Dc+Dd)/4. Thereby, pixel data Dg of the target pixel CG is calculated. The symbols Dg, Da, Db, Dc, and Dd respectively represent gradation values of pixel data at the target pixel CG, and the four vicinity pixels A, B, C, and D.

The optical correction is not limited to the foregoing approach. Alternatively, interpolation coefficients for defining respective weights to be applied to the vicinity pixels A, B, C, and D may be used, and image data of the before-correction-image may be subjected to linear interpolation by using the interpolation coefficients. Concerning the before-correction-image, it is not always the case that the target pixel CG is located at the middle of a square defined by the vicinity pixels A, B, C, and D, as shown in FIG. 7. For instance, the target pixel CG may be located at a position closer to one of the vicinity pixels A, B, C, and D depending on the position of the target pixel CG in the before-correction-image. Also, it is not always the case that the vicinity pixels are arranged in a grid pattern as shown in FIG. 7. In the above occasion, performing linear interpolation in such a manner that the vicinity pixel A, B, C, D at a position closer to the target pixel CG greatly affects the target pixel CG enables to precisely perform optical correction. In view of this, the interpolation coefficients to be used in the before-correction-image are set in such a manner that the value of the interpolation coefficient is increased, as the corresponding vicinity pixel A, B, C, D is located at a position closer to the target pixel CG; and linear interpolation is performed by using the interpolation coefficients. This enables to advantageously perform optical correction with high precision.

Specifically, the LUT 622 stores interpolation coefficients k1, k2, k3, and k4 for the respective vicinity pixels A, B, C, and D along with a coordinate value in the before-correction-image in the address to which each pixel in the after-correction-image is correlated. In response to designation of an address by the address designator 621, as shown by the broken line in FIG. 6, the LUT 622 outputs the interpolation coefficients k1, k2, k3, and k4 stored in the designated address to the interpolator 624.

The interpolator 624 performs a computation: Dg= (k1*Da+k2*Db+k3*Dc+k4*Dd)/4 by using the interpolation coefficients k1, k2, k3, and k4 outputted from the LUT 622, and the gradation values Da, Db, Dc, and Dd of the vicinity pixels A, B, C, and D outputted from the memory 623 to calculate the gradation value Dg of the target pixel CG.

It may be preferable to use at least two vicinity pixels depending on the position of the target pixel CG in the before-correction-image, in place of using all the four vicinity pixels A, B, C, and D. In the above arrangement, the LUT 622 may store, in each address, vicinity pixel information for designating the vicinity pixels to be used in pixel interpolation, in addition to the coordinate value of the target pixel CG. In response to designation of an address by the address designator 621, the LUT 622 outputs, to the memory 623, the coordinate value of the target pixel CG stored in the designated address, and the vicinity pixel information. Then, the memory 623 specifies a vicinity pixel to be outputted to the interpolator 624, based on the coordinate value of the target pixel CG and the vicinity pixel information which have been outputted from the LUT 622, and outputs the specified vicinity pixel to the interpolator 624.

Then, the interpolator 624 calculates an average value of the gradation values of the vicinity pixels which have been outputted from the memory 623, and defines the average value as the gradation value of the target pixel CG. In the above modification, the interpolator 624 may calculate the gradation value of the target pixel CG by using the aforementioned interpolation coefficients, according to needs.

Referring back to FIG. 3, the compressor 63 extracts an illumination component from the image data to be outputted from the corrector 62, based on the space frequency of the image, and performs dynamic range compression of compressing the dynamic range of the image data by compressing the extracted illumination component. As an example of the dynamic range compression, low-pass filter processing for edge preservation recited in pages 82 through 88 of D1 may be adopted.

Specifically, one frame of image data outputted from the corrector 62 is downsampled a predetermined number of times, with use of a relatively small sized two-dimensional low-pass filter e.g. a filter of a size 3×3 or 5×5, thereby subjecting an original image to multiple resolution. Then, the image data is upsampled the predetermined number of times while replacing an edge portion of an image in a low resolution area with an image in a high resolution area in an upper stage, thereby extracting an illumination component. Then, the extracted illumination component is compressed in accordance with a predetermined compression characteristic. Then, the compressed illumination component is multiplied by a reflectance component to be obtained by dividing the original image by the illumination component before compression. Thereby, image data which has undergone dynamic range compression is generated.

By performing the dynamic range compression, it is possible to obtain an image having a large degree of blur with use of a relatively small sized low-pass filter. This enables to extract an illumination component with high precision, while reducing the computation amount. Also, since low-pass filter processing for edge preservation is performed, the above arrangement enables to suppress a drawback called halo effect around an edge portion of an image.

The processing of extracting an illumination component is not limited to the above. For instance, it may be possible to adopt a processing method for extracting an illumination component based on a space frequency of an image, comprising: predefining a cutoff frequency FL; extracting an image portion having a space frequency higher than the cutoff frequency FL, as a reflectance component; and extracting an image portion having a space frequency lower than the cutoff frequency FL, as an illumination component.

In the following, an operation to be performed by the image processor 6 shown in FIG. 3 is described. First, in response to output of image data in the unit of pixel from the A/D converter 5, the gradation value of the image data is compared with the reference value Vth by the converter 61. In the case where the gradation value of the image data is larger than the reference value Vth, the image data is converted into data having a linear characteristic for output. In the case where the gradation value is equal to or smaller than the reference value Vth, the image data is outputted as it is.

Subsequently, the image data are sequentially outputted from the converter 61 in such a manner that one frame of image data is inputted to the corrector 62. The inputted frame of image data is optically corrected by the corrector 62, and the optically corrected frame of image data is sequentially outputted to the compressor 63 in the unit of pixel. Then, in response to input of the optically corrected frame of image data, the compressor 63 compresses the dynamic range of the inputted image data, and the compressed image data is sequentially outputted to the image memory 7 shown in FIG. 1 in the unit of pixel for storing.

In the following, an effect caused by performing a processing of unifying the photoelectric conversion characteristics before the optical correction is performed is described. As described above, the image sensor 3 has photoelectric conversion characteristics i.e. a linear characteristic and a logarithmic characteristic. Accordingly, image data to be inputted to the image processor 6 is image data having a linear characteristic and a logarithmic characteristic.

In view of the above, in this embodiment, the corrector 62 performs optical correction by subjecting a target pixel to linear interpolation with use of the vicinity pixels A, B, C, and D. In this arrangement, if the optical correction is performed with respect to input image data without any processing, the following computation processing is performed. $Dg=(Da+Db+Dc+Dd)/4$.

In performing the computation: $Dg=(Da+Db+Dc+Dd)/4$, in the case where all the gradation values Da, Db, Dc, and Dd at the four vicinity pixels A, B, C, and D have a linear characteristic, a computation: $Dg=(j1 \times La+j1 \times Lb+j1 \times Lc+j1 \times Ld)/4$ is performed, where La, Lb, Lc, Ld indicates an incident light amount at the vicinity pixel A, B, C, D, and j1 indicates a photoelectric conversion coefficient to be used in a linear characteristic. In this arrangement, since all the gradation values Da, Db, Dc, and Dd have a linear characteristic, the gradation value Dg of the target pixel CG becomes an average value depending on the incident light amounts at the four vicinity pixels.

In the case, however, where the gradation value Da has a linear characteristic, the gradation value Db has a logarithmic characteristic, the gradation value Dc has a linear characteristic, and the gradation value Dd has a logarithmic characteristic, a computation: $Dg=(j1 \times La+j2 \times Log(Lb)+j1 \times Lc+j2 \times Log(Ld))/4$ is performed, where La, Lb, Lc, Ld indicates an incident light amount at the vicinity pixel A, B, C, D, j1 indicates a photoelectric conversion coefficient to be used in a linear characteristic, and j2 indicates a photoelectric conversion coefficient to be used in a logarithmic characteristic.

In the above arrangement, since the photoelectric conversion characteristics are different among the vicinity pixels A, B, C, and D, the gradation value Dg is not an average value depending on the incident light amounts at the four vicinity pixels. Instead, image data to be outputted from the image processor 6 may be non-uniformly interpolated with respect to the incident light amount at the vicinity pixel A, B, C, and D, which may cause image degradation. In view of this, the image processor 6 is operable to unify the photoelectric conversion characteristics of image data to be inputted to the corrector 62 into a linear characteristic or a logarithmic characteristic before performing the optical correction. This enables to prevent a likelihood that image data having different photoelectric conversion characteristics may be outputted with respect to each of the pixels.

In the following, an effect caused by performing optical correction prior to dynamic range compression is described. An image to be inputted to the image processor 6 may be a picked-up image having a different resolution depending on the image pickup position, resulting from the optical characteristic of the lens section 2. Accordingly, in the case where a subject image is picked up, the space frequency of a middle part of the picked-up subject image may be different from the space frequency of a peripheral part of the picked-up subject image.

Assuming that the cutoff frequency to be used in extracting an illumination component of a subject image is FL, an image portion having a space frequency not smaller than the cutoff frequency FL becomes a reflectance component, and an image portion having a space frequency smaller than the cutoff frequency FL becomes an illumination component.

In the above condition, assuming that the space frequency of the middle part of a picked-up subject image is F1, and the space frequency of the peripheral part of the picked-up subject image is F2, in the case where both of the space frequencies F1 and F2 are smaller or larger than the cutoff frequency F1, there is no drawback, because the space frequency of the middle part and the peripheral part of the picked-up subject image is extracted as an illumination component or a reflectance component.

However, in the case where the space frequency F1 is smaller than the cutoff frequency FL, and the space frequency F2 is not smaller than the cutoff frequency FL, the middle part of the picked-up subject image is extracted as an illumination component, and the peripheral part of the picked-up subject image is extracted as a reflectance component. Accordingly, some part of the subject image may be extracted as an illumination component, and the other part thereof may be extracted as a reflectance component depending on the image pickup position.

In view of the above, the image processor 6 performs a processing of making the resolution of an image to be inputted after the optical correction substantially uniform, before dynamic range compression is performed. This enables to prevent a likelihood that some part of a subject image may be extracted as an illumination component and the other part thereof may be extracted as a reflectance component depending on the image pickup position.

As described above, the image pickup apparatus 1 is configured in such a manner that photoelectric conversion characteristics are unified into a single photoelectric conversion characteristic by the converter 61 before optical correction is performed by the corrector 62. Accordingly, the pixels having the single photoelectric conversion characteristic are subjected to linear interpolation, thereby enabling to generate output image data having the unified photoelectric conversion characteristic.

Further, the dynamic range compression by the compressor 63 is performed after the optical correction. Accordingly, the dynamic range compression is performed after the resolution of the middle part and the peripheral part of the subject image is made substantially uniform. This enables to eliminate a likelihood that image data corresponding to some part of the subject image may be compressed, and image data corresponding to the other part thereof may be left uncompressed depending on the image pickup position.

(Summary of the Embodiment)

(1) An image processing device according to an aspect of the invention includes: a corrector for performing an optical correction of correcting a distortion of an image by interpolating image data of the distorted picked-up image resulting from an optical characteristic of an image pickup section, and locally changing a resolution of the image; and a compressor for performing a dynamic range compression of compressing a dynamic range of the image data by extracting an illumination component from the image data based on a space frequency of the image, and compressing the extracted illumination component, wherein the compressor performs the dynamic range compression with respect to the image data to be obtained after the optical correction is performed by the corrector.

An image processing method according to another aspect of the invention includes: a correcting step of correcting a distortion of an image by interpolating image data of the distorted picked-up image resulting from an optical characteristic of an image pickup section, and locally changing a resolution of the image; and a compressing step of performing a dynamic range compression of compressing a dynamic range of the image data by extracting an illumination component from the image data based on a space frequency of the image, and compressing the extracted illumination component, wherein the compressing step is performed after the correcting step.

In the above arrangements, the dynamic range compression is performed after the optical correction. Accordingly, after the resolution of a middle part and a peripheral part of the image is made uniform, the dynamic range compression is performed. As a result, the middle part of the picked-up subject image and the peripheral part of the picked-up subject image have substantially the same frequency characteristic. This enables to eliminate a likelihood that image data corresponding to some part of the subject image may be compressed, and image data corresponding to the other part of the subject image maybe left uncompressed depending on the image pickup position.

(2) An image processing device according to an aspect of the invention includes: a converter for unifying multiple photoelectric conversion characteristics of image data of an image picked up by an image pickup section having multiple photoelectric conversion characteristics into a single photoelectric conversion characteristic; and a corrector for performing an optical correction of correcting a distortion of the image by interpolating the image data of the distorted picked-up image resulting from an optical characteristic of the image pickup section, and locally changing a resolution of the image, wherein the converter unifies the photoelectric conversion characteristics with respect to the image data to be obtained before the optical correction is performed by the corrector.

An image processing method according to another aspect of the invention includes: a converting step of unifying multiple photoelectric conversion characteristics of image data of an image picked up by an image pickup section having multiple photoelectric conversion characteristics into a single photoelectric conversion characteristic; and a correcting step of performing an optical correction of correcting a distortion of the image by interpolating the image data of the distorted picked-up image resulting from an optical characteristic of the image pickup section, and locally changing a resolution of the image, wherein the converting step is performed before the correcting step.

In the above arrangements, the image data having the multiple photoelectric conversion characteristics is unified into image data having the single photoelectric conversion characteristic by the converter before the optical correction is performed. This arrangement enables to linearly interpolate the pixels having the single photoelectric conversion characteristic, thereby enabling to generate output image data having the unified photoelectric conversion characteristic.

(3) Preferably, the image processing device may include the converter, the corrector, and the compressor. The converter may perform the processing of unifying the photoelectric conversion characteristics with respect to the image data to be obtained before the optical correction is performed by the corrector. The compressor may perform the dynamic range compression with respect to the image data to be obtained after the optical correction is performed by the corrector.

The above arrangement enables to eliminate a likelihood that image data corresponding to some part of the subject image may be compressed, and image data corresponding to the other part of the subject image maybe left uncompressed depending on the image pickup position, and generate output image data having the unified photoelectric conversion characteristic.

(4) Preferably, the corrector includes: a coordinate storage for storing, in advance, a coordinate value in a before-correction-image to be obtained before the optical correction is performed, in correlation to each pixel in an after-correction-image to be obtained after the optical correction is performed; a coordinate output section for sequentially outputting the coordinate value in the before-correction-image from the coordinate storage; an image data storage for storing image data of the before-correction-image to output pixel data of a vicinity pixel located in the vicinity of a target pixel having the coordinate value outputted from the coordinate storage; and an interpolator for calculating pixel data of the target pixel based on the pixel data of the vicinity pixel outputted from the image data storage.

The above arrangement enables to correct the pixel data of the target pixel with respect to the vicinity pixel without incongruity.

(5) Preferably, the interpolator may calculate the pixel data of the target pixel by increasing a weight to be applied to the pixel data of the vicinity pixel, as the vicinity pixel approaches the target pixel.

The above arrangement enables to correct the pixel data of the target pixel with respect to the vicinity pixel without incongruity.

(6) Preferably, the image data storage may output the pixel data of the vicinity pixel by defining four pixels in the vicinity of the target pixel as the vicinity pixel, and the interpolator may calculate an average value of the pixel data of the vicinity pixels to define the average value as the pixel data of the target pixel.

In the above arrangement, the average value of the pixel data of the four vicinity pixels is calculated and defined as the pixel data of the target pixel. This enables to correct the pixel data of the target pixel with respect to the vicinity pixel without incongruity.

(7) Preferably, the image pickup section may have two kinds of photoelectric conversion characteristics, one being a linear characteristic in a low luminance range with respect to an inflection point, and the other being a logarithmic characteristic in a high luminance range with respect to the inflection point, and the converter may convert the logarithmic characteristic into the linear characteristic.

In the above arrangement, the logarithmic characteristic is converted into the linear characteristic before the optical correction is performed. This enables to unify the photoelectric conversion characteristic of the output image data into the linear characteristic.

(8) An image pickup apparatus according to still another aspect of the invention includes the image processing device having the arrangement (1).

The above arrangement enables to provide an image pickup apparatus capable of eliminating a likelihood that image data corresponding to some part of the subject image may be compressed, and image data corresponding to the other part of the subject image may be left uncompressed depending on the image pickup position.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image processing method, comprising:
   a converting step of unifying multiple photoelectric conversion characteristics of image data of an image picked up by an image pickup section having multiple photoelectric conversion characteristics into a single photoelectric conversion characteristic; and
   a correcting step of performing an optical correction of correcting a distortion of the image by interpolating the image data of the distorted picked-up image resulting from an optical characteristic of the image pickup section, and locally changing a resolution of the image, wherein
   the converting step is performed before the correcting step.

* * * * *